United States Patent [19]
Hirose et al.

[11] Patent Number: 5,057,989
[45] Date of Patent: Oct. 15, 1991

[54] PWM CONTROLLED DC/AC POWER CONVERTER

[75] Inventors: Syun-ichi Hirose, Tokyo; Toshiaki Kudor, Hachioji; Takeichi Kawakami, Fuchu, all of Japan

[73] Assignee: Kabushiki Kaisha Toshiba, Kawasaki, Japan

[21] Appl. No.: 575,613

[22] Filed: Aug. 31, 1990

Related U.S. Application Data

[63] Continuation-in-part of Ser. No. 280,814, Dec. 7, 1988, abandoned.

[30] Foreign Application Priority Data

Dec. 9, 1987 [JP] Japan ................. 62-311239

[51] Int. Cl.[5] ........................................... H02M 7/44
[52] U.S. Cl. ........................................ 363/95; 363/96
[58] Field of Search .................... 363/95, 96, 97, 98

[56] References Cited

U.S. PATENT DOCUMENTS

| 4,377,779 | 3/1983 | Plunkett | 363/41 |
| 4,562,524 | 12/1985 | Mutoh et al. | 363/97 |
| 4,595,976 | 6/1986 | Parro | 363/98 |
| 4,615,000 | 9/1986 | Fuji et al. | 363/98 |
| 4,628,475 | 12/1986 | Azusawa et al. | 363/42 |
| 4,757,434 | 7/1988 | Kawabata et al. | 363/132 |
| 4,772,996 | 9/1988 | Hanei et al. | 363/98 |
| 4,875,149 | 10/1989 | Rozman et al. | 363/98 |
| 4,905,134 | 2/1990 | Recker et al. | 363/37 |

FOREIGN PATENT DOCUMENTS

| 3151318 | 8/1982 | Fed. Rep. of Germany . |
| 3403802 | 8/1984 | Fed. Rep. of Germany . |
| 2461401 | 3/1983 | France . |
| 58-64519 | 4/1983 | Japan . |
| 59-59081 | 4/1984 | Japan . |

Primary Examiner—Steven L. Stephan
Assistant Examiner—Jeffrey Sterrett
Attorney, Agent, or Firm—Foley & Lardner

[57] ABSTRACT

In an apparatus for controlling a power converter, which is adapted to control, in accordance with a PWM system, a voltage-type inverter for system interconnection interposed between a d.c. power source and an a.c. system to interchange power therebetween, a scheme is employed to switch voltage amplitude adjustment signals of respective phases depending upon an output voltage phase signal provide a phase voltage amplitude. Energization periods of respective controllable rectifier elements of the power converter are determined on the basis of the phase voltage amplitude and the output voltage phase signal. Employment of such a scheme makes it possible to independently control the output voltage of the inverter every phase or with respect to both positive and negative sides of the phases, respectively.

6 Claims, 7 Drawing Sheets

PWM CONTROLLED DC/AC POWER CONVERTER

CROSS-REFERENCE TO RELATED APPLICATION

The application is a continuation-in-part of U.S. patent application Ser. No. 07/280,814, filed Feb. 7, 1988, now abandoned.

BACKGROUND OF THE INVENTION

This invention relates to an apparatus for controlling a power converter, which is adapted to control, in accordance with the PWM system, a power converter for system interconnection interposed between the d.c. power source and the a.c. system to adjust interchange power therebetween.

Power converters for system interconnection of this kind may have an inverter operating mode used in supplying power from the d.c. power source to the a.c. system and a rectifier operating mode used in supplying power from the a.c. system to the d.c. power in a manner opposite to the above.

When it is assumed that a voltage on the a.c. side of a power converter is $V_{in}$, a voltage of the a.c. system is $V_{sy}$, a reactance between the d.c. power source and the a.c. system is X, and a phase difference angle between the voltage $V_{in}$ and the voltage $V_{sy}$ is $\phi$ (which is positive when the phase of the voltage $V_{in}$ leads the phase of the voltage $V_{sy}$), effective or active power P and reactive power Q processed in the power converter are respectively expressed as follows:

$$P = \{(V_{in} \cdot V_{sy})/X\} \sin \phi \quad (1)$$

$$Q = (V_{in} \cdot V_{sy} \cos \phi - V_{sy}^2)/X \quad (2).$$

Where the power converter is operated in the rectifier operating mode, the amplitude of voltage $V_{in}$ is smaller than that of voltage $V_{sy}$ and the phase of voltage $V_{in}$ lags that of voltage $V_{sy}$. Thus, the power converter dissipates lagging reactive power Q and transmits effective power P from the a.c. system to the d.c. power source. Moreover, as apparent from the above equations (1) and (2), even if the amplitude of voltage $V_{in}$ is smaller than that of voltage $V_{sy}$, as long as the phase of voltage $V_{in}$ leads that of voltage $V_{sy}$, the power Converter the dissipates lagging reactive power Q and transmits the effective power P from the d.c. power source to the a.c. system.

When the effective value of the voltage $V_{in}$ satisfies the condition expressed by the following equation with respect to the effective value of the voltage $V_{sy}$, $$V_{in} V_{sy}/\cos \phi \quad (3)$$

the power converter operates as a capacitor and transmits effective power from the a.c. system to the d.c. power source. When the phase difference angle $\phi$ is positive as apparent from the above equations (1) and (2) even in the case where the above equation (3) is satisfied, the power converter operates as a capacitor and transmits the effective power from the d.c. power source to the a.c. system.

When it is assumed that the voltage on the d.c. side of the power converter, i.e., the voltage of the d.c. power source is $V_{dc}$, the modulation factor in the PWM Control of the power converter is $M_f$ ($0 \leq M_f \leq 1$), and k is a constant, the voltage $V_{in}$ on the a.c. side of the power converter is expressed as follows:

$$V_{in} = k \cdot V_{dc} \cdot M_f \quad (4).$$

Substitution of the equation (4) into the equations (1) and (2) respectively gives:

$$P = V_{sy}(k \cdot M_f V_{dc}/X) \sin \phi \quad (5), \text{ and}$$

$$Q = \{V_{sy}(k \cdot M_f V_{dc} \cos \phi) - V_{sy}^2\}/X \quad (6).$$

As is apparent from the above equations (5) and (6), by controlling the modulation factor $M_f$ and/or the phase difference angle $\phi$ by the power converter, the effective power P and the reactive power Q can be adjusted.

Meanwhile, the three phases are not necessarily balanced with each other in an ordinary a.c. system voltage. There are many instances where three phases are imbalanced, for example, in a form such that amplitudes are different from each other in the respective R, S and T phases. Even in the case where the a.c. system voltage is imbalanced as stated above, the above-described power converter can interchange the effective and reactive powers between the a.c. system and the d.c. power source. However, because the three phases of the a.c. system voltage are imbalanced, the effective and reactive powers with three phases being as a lump under conditions where amplitudes of the output a.c. voltage are different from each other in the three phases take predetermined values, respectively. In this case, when the degree of imbalance becomes large, the output current of the converter of a specified phase will increase and therefore current over an allowed current will flow in controllable rectifier elements at the specified phase. As a result, it becomes impossible to continue the operation of the converter.

In addition to the above-described inconvenience, there is another inconvenience described below. Since there essentially exists unevenness in the characteristics of respective controllable rectifier elements even if the energization periods of respective controllable rectifier elements of the converter are determined, energization is not necessarily conducted as required by a designated energization period, so that there may be produced unevennesses between energization periods of respective controllable rectifier elements. Such unevennesses between energization periods of respective controllable rectifier elements causes the current on the a.c. side of the converter to produce d.c. components. The d.c. components mentioned above cause d.c. polarized magnetization in the interconnecting transformer ordinarily provided between the converter and the a.c. system, thus allowing the interconnecting transformer to overheat, or otherwise extremely distorting an output current of the converter. When the occasion demands, there may occur a circumstance where a large peak current based on strain exceeds an allowed current value of the controllable rectifier element. Such circumstances make the operation of the converter impossible.

SUMMARY OF THE INVENTION

Therefore, an object of this invention is to provide an apparatus for controlling a power converter interposed between the d.c. power source and the a.c. system to interchange power therebetween, which is capable of eliminating the above-described overcurrent or d.c.

polarized magnetization based on imbalance of the a.c. system voltage or unevenness between element characteristics.

In accordance with this invention, there is provided an apparatus for controlling a power converter comprising synchronous detector means for detecting a phase of an a.c. system voltage to output it as a synchronizing signal, output voltage phase signal generator means for determining a phase of an output a.c. voltage from a phase difference angle adjustment signal for determination of a phase difference between the a.c. system voltage and the output a.c. voltage and the synchronizing signal from the synchronous detector means to output it as an output voltage phase signal, phase voltage amplitude signal generator means for obtaining a voltage amplitude adjustment signal for determining an amplitude per phase of the output a.c. voltage to switch voltage amplitude adjustment signals of at least two phases in accordance with an output voltage phase signal for the output voltage phase signal generator circuit to output a signal obtained by switching as a phase voltage amplitude signal, and firing signal generator means for determining energization periods of respective controllable rectifier elements constituting the power converter from the voltage phase signal on the basis of the output voltage phase signal generator circuit and the phase voltage amplitude signal from the phase voltage amplitude signal generator circuit.

DESCRIPTION OF THE PREFERRED EMBODIMENTS

Figure 1:
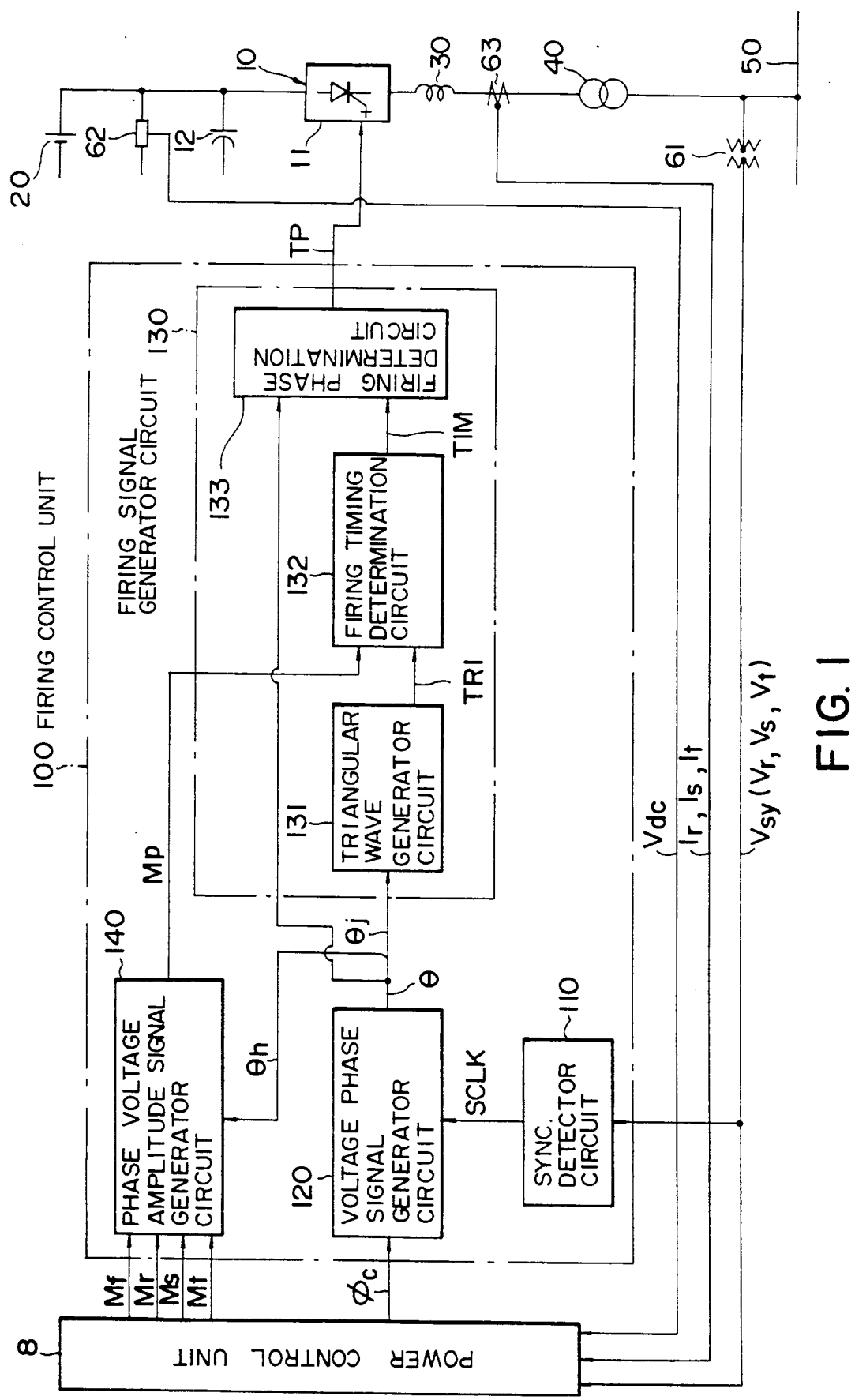
FIG. 1 is a block diagram showing an embodiment of an apparatus for controlling a power converter according to this invention.

In FIG. 1, a voltage controlled type inverter 11 generally used for system interconnection as a power converter controlled by a control apparatus according to this invention is shown. An inverter main circuit 10 is constituted by the inverter 11 and d.c. capacitor 12 connected on the d.c. input side thereof. A d.c. power source 20 is interconnected with an a.c. system 50 through the inverter main circuit 10, an interconnecting reactor 30 and an interconnecting transformer 40.

Figure 2:
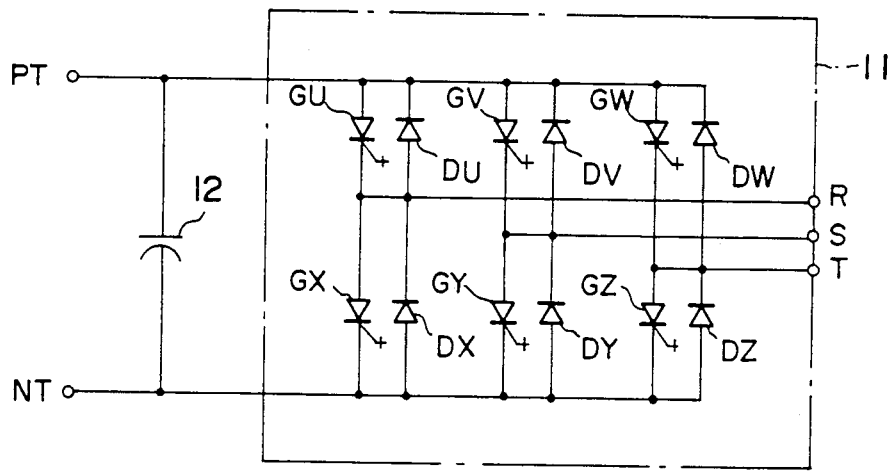
FIG. 2 is a connection diagram showing the detailed construction of the converter shown in FIG. 1.

FIG. 2 shows the circuit construction of the voltage controlled inverter 11 constituting the inverter main circuit 10. This circuit arrangement is provided with a pair of positive and negative d.c. terminals PT and NT, and three-phase a.c. terminals R, S and T. The inverter 11 is composed of six controllable rectifier elements GU, GV, GW, GX, GY and GZ which are three-phase bridge connected, and six free-wheeling diodes DU, DV, DW, DX, DY and DZ connected in inverse-parallel with these controllable rectifier elements, respectively. Such controllable rectifier elements GU to GZ are each comprised of an element of the self-quenching type, such as, for example, a gate turn off thyristor (GTO).

The interchange of power in the system construction of FIG. 1 is controlled by the inverter 11. For controlling such interchange of power, the voltage of the a.c. system 50, i.e., system voltage $V_{sy}$ is detected by a potential transformer (which will be referred to as "PT" hereinafter) 61, the voltage of the d.c. power source 20, i.e., d.c. voltage $V_{dc}$ is detected by a d.c. voltage detector (which will be referred to as "VD" hereinafter) 62, and output a.c. currents $I_r$, $I_s$ and $I_t$ of respective phases of the inverter 11 are detected by a current transformer (which will be referred to as a "CT" hereinafter) 63.

In order to form a control signal for adjusting an effective power P and a reactive power Q flowing into the a.c. system 50, a power control unit 8 is provided. The power control unit 8 calculates the modulation factor $M_f$ for voltage adjustment, and the phase difference angle $\phi$ in accordance with the above equations (5) and (6) for the purpose of allowing the inverter 11 to interchange predetermined effective and reactive powers P and Q on the basis of the system voltage $V_{sy}$ (phase voltages $V_r$, $V_s$, $V_t$) and the d.c. voltage $V_{dc}$ respectively detected by pT 61 and VD 62. Furthermore, the power control unit 8 calculates correction modulation factor signals $M_r$, $M_s$ and $M_t$ of respective phases for adjusting the output voltage amplitudes of respective phases on the basis of respective phase alternating currents $I_r$, $I_s$ and $I_t$ detected by the CT 63 or respective phase voltages $V_r$, $V_s$ and $V_t$ of the system. Thus, the power control unit 8 sends the respective values obtained by calculation to the firing control unit 100.

For example, for the purpose of suppressing d.c. polarized magnetization of the interconnecting transformer 40, d.c. components included in the alternating currents $I_r$, $I_s$ and $I_t$ of respective phases are detected, whereby correction modulation factor signals $M_r$, $M_s$ and $M_t$ are determined so as to suppress such d.c. components. In this case, alternating currents $I_r$, $I_s$ and $I_t$ are respectively integrated per cycle of the a.c. voltage to assume these three integrated values as correction modulation factor signals $M_r$, $M_s$ and $M_t$, respectively. In the case of using a single three-phase transformer in place of three single-phase transformers as the interconnecting transformer, because the relationship of $I_r + I_s + I_t = 0$ holds, one of three correction modulation factor signals may be set to a fixed value.

Furthermore, in order to balance output currents of the inverter under the condition where the three-phase voltages $V_r$, $V_s$ and $V_t$ of the system are unbalanced, it is sufficient to output differences between the system voltage $V_{sy}$ and respective phase voltages $V_r$, $V_s$ and $V_t$ as correction modulation factor signals $M_r$, $M_s$ and $M_t$, respectively.

Figure 3:
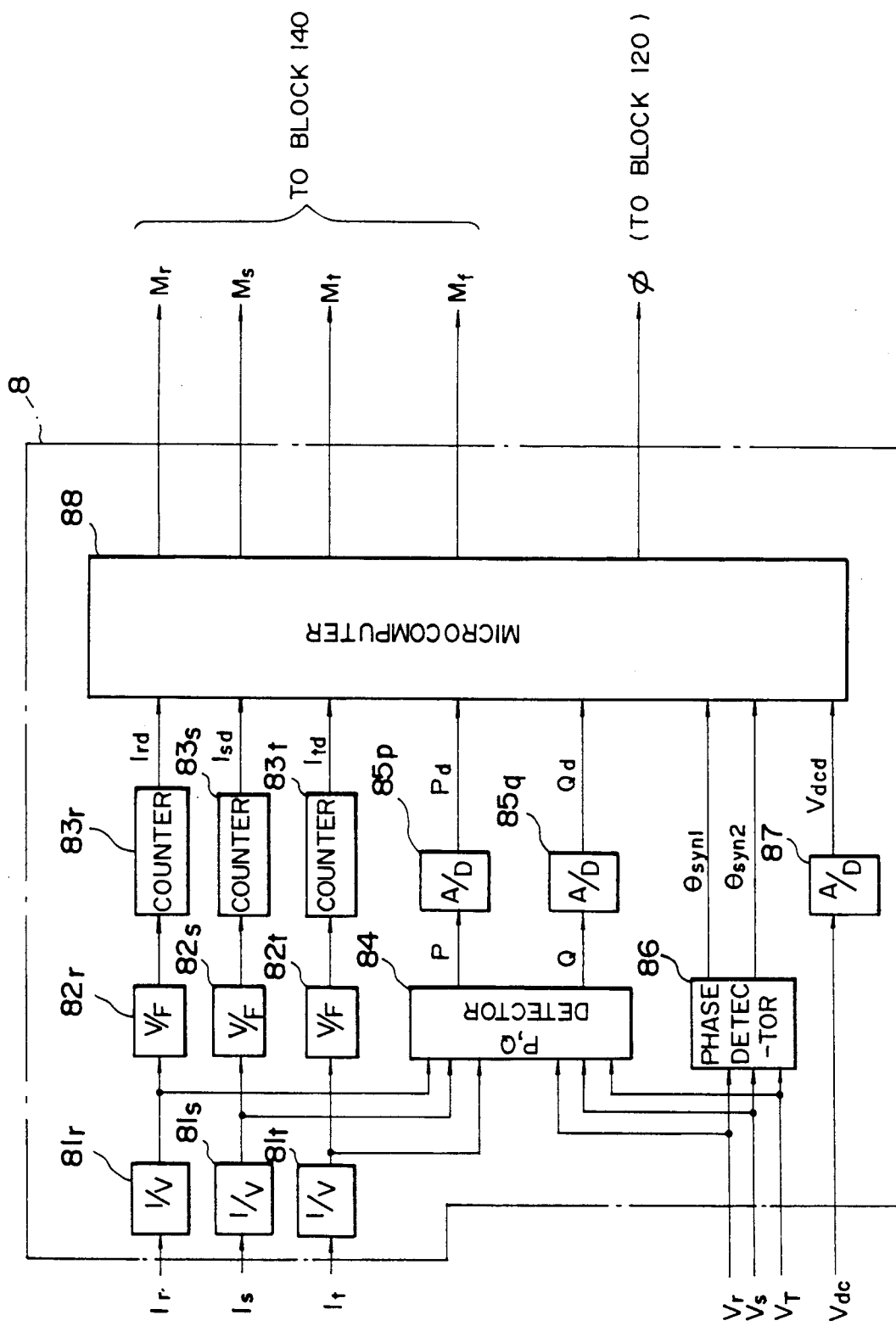
FIG. 3 is a block diagram showing the detailed construction of the power control unit shown in FIG. 1.

The arrangement of the power control unit 8 will be detailed with reference to FIG. 3. For A/D converting the alternating currents $I_r$, $I_s$, $I_t$, it provides the current /voltage converters $81_r$, $81_s$, $81_t$, the voltage/frequency converters $82_r$, $82_s$, $82_t$ and the counters $83_r$, $83_s$, $83_t$ respectively for the phases. For obtaining the digital values of the effective and reactive powers P and Q, it provides an effective and reactive powers detector 84 and A/D converters $85_p$, $85_q$. The power control unit 8 also provides a phase detector circuit 86, an A/D converter 87 and a microcomputer 88.

The phase alternating currents $I_r$, $I_s$, $I_t$ are respectively converted into voltage signals in the current-/voltage converts $81_r$, $81_s$, $81_t$ and then are converted into pulse signals in the voltage/frequency converters $82_r$, $82_s$, $82_t$. These pulse signals are respectively sent to the counters $83_r$, $83_s$, $83_t$. The microcomputer 88 reads output signals $I_{rd}$, $I_{sd}$, $I_{td}$ from the counters $83_r$, $83_s$, $83_t$. It performs a read each time it receives a group of six 60° phase voltage signals $\theta_{synl}$. The phase voltage is detected in the phase detector 86 from the phase voltages $V_r$, $V_s$, $V_t$.

A phase locked loop disclosed in U.S. Pat. No. 4,307,346 may be used as the phase detector 86. For example, the signal $\theta_{syn2}$ is a 12-bit signal for detecting a phase angle of the phase voltage. In this case, $6 \times 2^{9}$ counts of the phase detector 86 may correspond to 360 electrical degrees.

One bit of the signal $\theta_{syn2}$ of the twelve bits can be used as a signal $\theta$synl. In such a case, if a signal which repeats "0" and "1" every 30 electrical degrees is used as an interrupt signal for a microcomputer, a variation of the signal can be detected by the microcomputer. (A circuit with the constructed the same as the synchronous detector circuit 110 shown in FIG. 1 can be used as the phase detector 86, as will be mentioned later.)

The phase detector 86 constantly supplies a system voltage phase signal $\theta_{syn2}$ to the microcomputer 88. The effective and reactive powers detector 84 serves to compute an effective and reactive powers based on the phase alternating currents $I_r$, $I_s$, $I_t$ and the phase voltages $V_r$, $V_s$, $V_t$ and supply them as the effective and reactive powers P and Q.

The power detection circuit 84 calculates the effective and reactive powers P and Q according to the following equations;

$$P = I_R \cdot V_R + I_S \cdot V_S + I_T \cdot V_T \quad (7)$$

$$Q = \{I_R \cdot (V_T - V_S) + I_S \cdot (V_R - V_T) + I_T \cdot (V_S - V_R)\}/\sqrt{3} . \quad (8)$$

These powers P and Q are converted into digital signals $P_d$ and $Q_d$ in the A/D converters $85_p$ and $85_q$ and the resulting digital signals are entered into the microcomputer 88. The d.c. voltage $V_{dc}$ is converted into a digital signal in the A/D converter 87 and then the resulting digital signal is entered into the microcomputer 88.

Figure 4:
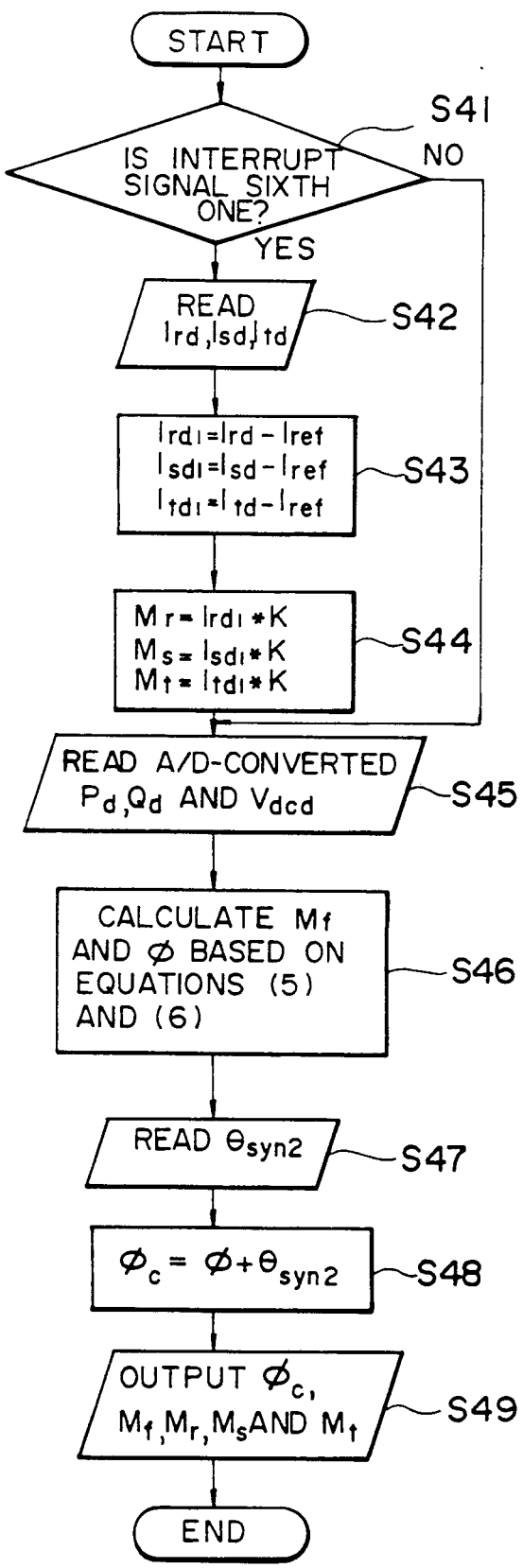
FIG. 4 is a flow chart for explaining the function of the microcomputer shown in FIG. 3.

FIG. 4 is a flowchart illustrating how the microcomputer 88 operates. The routine shown in this flowchart is executed each time the microcomputer 86 receives as an interrupt signal the signal $\theta_{synl}$, sent from the phase detector 86. In response to the signal $\theta_{synl}$, the microcomputer 86 checks if it is the sixth signal (step S41) and, if it is, reads the currents $I_{rd}$, $I_{sd}$, $I_{td}$ (step S42). With this process, it reads the currents $I_{rd}$, $I_{sd}$, $I_{td}$ at each one cycle of systematic voltages ($6 \times 60° = 360°$). If a mean value of the currents $I_{rd}$, $I_{sd}$, $I_{td}$ within one cycle is zero, these currents $I_{rd}$, $I_{sd}$, $I_{td}$ are respectively made to be a predetermined value $I_{ref}$. If it is non-zero, these Currents are made to another value.

The current components are calculated as follows (step S43):

$$I_{rd1} = I_{rd} - I_{ref}$$
$$I_{sd1} = I_{sd} - I_{ref} .$$
$$I_{td1} = I_{td} - I_{ref}$$

As is apparent from the equations, the current components are differences between positive components and negative ones of $I_{rd}$, $I_{sd}$, $I_{td}$, that is, the d.c. components of the currents $I_{rd}$, $I_{sd}$, $I_{td}$. For suppressing the biased magnetic field of the d.c. currents, it is necessary to control an amplitude of an output voltage of the inverter main circuit 10 in a manner to make all the current components $I_{rd1}$, $I_{sd1}$, $I_{td1}$ zero. For the control, the microcomputer 86 calculates modulation factors $M_r$, $M_s$, $M_t$ at each phase by multiplying the current components $I_{rd1}$, $I_{sd1}$, $I_{td1}$ with a gain K (step S44). Then, it reads an effective power signal $P_d$, a reactive power signal $Q_d$ and a d.c. voltage $V_{dcd}$ through the A/D converters $85_p$, $85_q$, 87 (St ⓡ p S45). Then, it calculates the modulation factor $M_f$ and a phase difference angle $\phi$ based on the equations (5) and (6) (step S47). Then, it reads a phase signal $\theta_{syn2}$ from the phase detector 86 (step S47) and calculates an equation of $\phi_c = \phi + \theta_{syn2}$ (step S48). At a final stage, it supplies the modulation factors $M_f$, $M_r$, $M_s$, $M_t$ to a phase voltage amplitude signal generator circuit 140 and the phase difference angle $\phi_s$ to a voltage phase signal generator circuit 120 (step S49).

Figure 5:
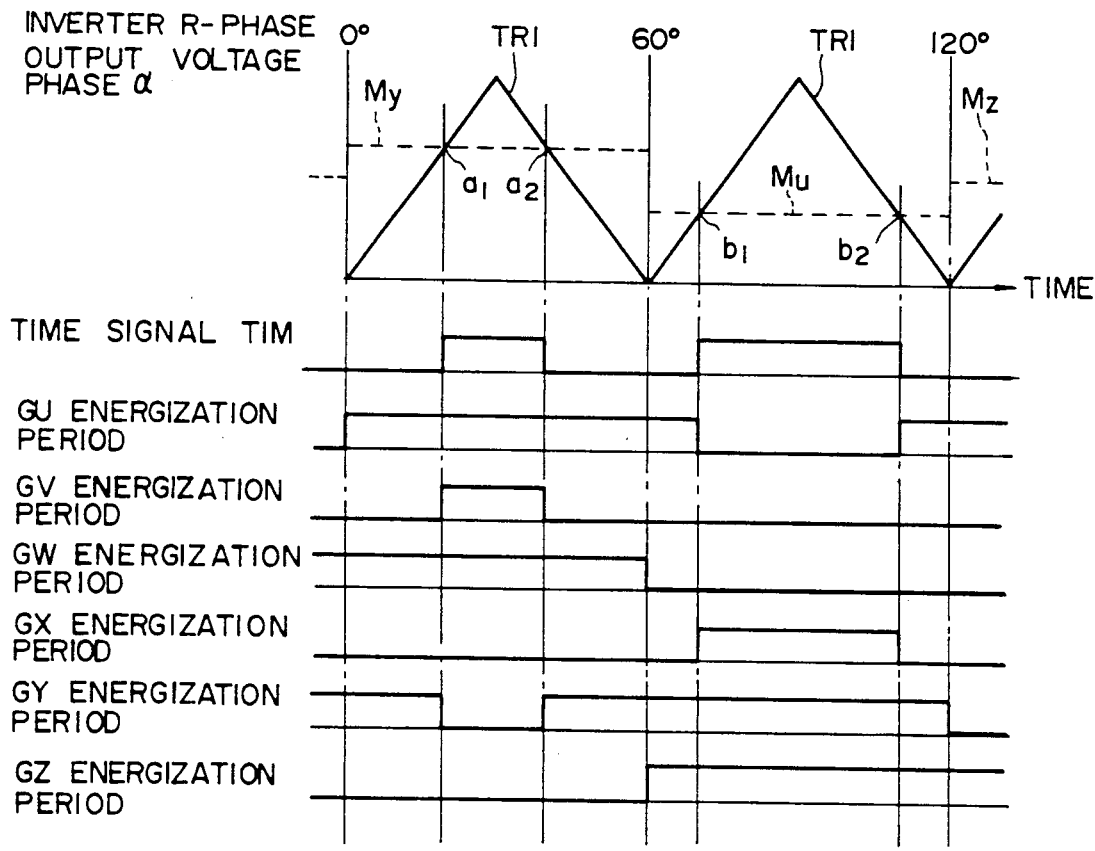
FIG. 5 is a time chart for explaining the function of the control apparatus shown in FIG. 1.

As shown in FIG. 1, the firing control unit 100 is provided with a synchronous detector circuit 110, a voltage phase signal generator circuit 120, a firing signal generator circuit 130, and a circuit 140 for producing a voltage amplitude signal per each phase (hereinafter simply referred to as a phase voltage amplitude signal generator circuit 140). The firing signal generator circuit 130 is comprised of a triangular wave generator circuit 131, a firing timing determination circuit 132, and a firing phase determination circuit 133. The triangular wave generator circuit 131 is a circuit to generate triangular wave signals TRI with 60 degrees being its period as shown in FIG. 5. The energization periods of respective controllable rectifier elements GU, GV, GW, GX, GY, and GZ are determined with the triangular wave signal TRI being as a reference. The synchronous detector circuit 110 obtains a system voltage $V_{sy}$ from PT 61 to detect the phase of the system voltage, thus to output a system phase signal SCLK. A phase locked loop circuit such as disclosed in U.S. Pat. No. 4,307,346 may be used as the synchronous detector circuit 110. The voltage phase signal generator circuit 120 receives a phase difference angle signal $\phi_c$ from the power control unit 8 to send, to the firing signal generator circuit 130, an output voltage phase signal $\theta$ comprised of a digital signal such that a phase difference angle between the output voltage of the inverter 11 and the voltage of the a.c. system 50 becomes equal to $\phi$ every time it receives the system phase signal SCLK from the synchronous generator circuit 110. The output voltage phase signal $\theta$ consists of a phase-judgment phase signal $\theta_h$ indicating a period of 360 degrees every 60 degrees with the R-phase output voltage being used as a reference, and a 60° period phase signal $\theta_j$ repeating from zero count to a predetermined count value every period of 60 degrees. This 60° period phase signal $\theta_j$ may be prepared by a binary counter circuit (not shown). In this case, when, e.g., an 11-bit binary counter circuit is used, the predetermined count value mentioned above becomes equal to $2^{11}-1=2047$ counts. In this example, the predetermined count value is set to 2047. The phase judgment phase signal $\theta_h$ may be prepared by a hexanary counter circuit repeating from 0 up to 5, and is assumed to have a relationship of Table 1 shown below between the phase-judgment phase signal $\theta_h$ and the phase $\alpha$ of the inverter R-phase output voltage.

TABLE 1

| Phase-Judgement Phase Signal $\theta_h$ | Phase $\alpha$ of Inverter Output Voltage R-Phase |
|---|---|
| 0 | $0° \leq \alpha < 60°$ |
| 1 | $60° \leq \alpha < 120°$ |
| 2 | $120° \leq \alpha < 180°$ |
| 3 | $180° \leq \alpha < 240°$ |
| 4 | $240° \leq \alpha < 300°$ |
| 5 | $300° \leq \alpha < 360°$ | nal generator circuit 140 at the time when the phase-judgment phase signal $\theta_h$ varies and the phase-judgment

TABLE 2

| Change of Phase-Judgement Phase Signal $\theta_h$ | Phase Voltage Amplitude Signal $M_p$ |
|---|---|
| Change from 0 to 1 | $M_f - M_s = M_y$ |
| Change from 1 to 2 | $M_f + M_r = M_u$ |
| Change from 2 to 3 | $M_f - M_t = M_z$ |
| Change from 3 to 4 | $M_f + M_s = M_v$ |
| Change from 4 to 5 | $M_f - M_r = M_x$ |
| Change from 5 to 0 | $M_f + M_t = M_w$ |

The phase voltage amplitude signal $M_p$ maintains the value when the phase-judgment phase signal $\theta_h$ changes last as long as the phase-judgment phase signal $\theta_h$ does not change. The phase voltage amplitude signal $M_p$ is varied as shown in Table 3 every 60 degrees of the phase of the R-phase output voltage of the inverter.

TABLE 3

| Phase $\alpha$ of Inverter R-phase Output Voltage | $0° \leq \alpha < 60°$ | $60° \leq \alpha < 120°$ | $120° \leq \alpha < 180°$ | $180° \leq \alpha < 240°$ | $240° \leq \alpha < 300°$ | $300° \leq \alpha < 360°$ |
|---|---|---|---|---|---|---|
| Phase-judgement phase signal $\theta_h$ | 0 | 1 | 2 | 3 | 4 | 5 |
| Phase voltage amplitude signal $M_p$ | $M_f - M_s = M_y$ | $M_f + M_r = M_u$ | $M_f - M_t = M_z$ | $M_f + M_s = M_v$ | $M_f - M_r = M_x$ | $M_f + M_t = M_w$ |
| Elements subject to energization period control of inverter 10 | GY and GV | GU and GX | GZ and GW | GV and GY | GX and GU | GW and GZ |
| Phase voltage controlled of output voltages of inverter 10 | Negative side of S-phase | Positive side of R-phase | Negative side of T-phase | Positive side of S-phase | Negative side of R-phase | Positive side of T-phase |

The output voltage phase signal $\theta$ consists of a phase-judgment phase signal $\theta_h$ and 60° period phase signal $\theta_j$, and is in such a form to express the phase $\alpha$ of the R-phase output voltage of the inverter as a digital signal.

Figure 6:
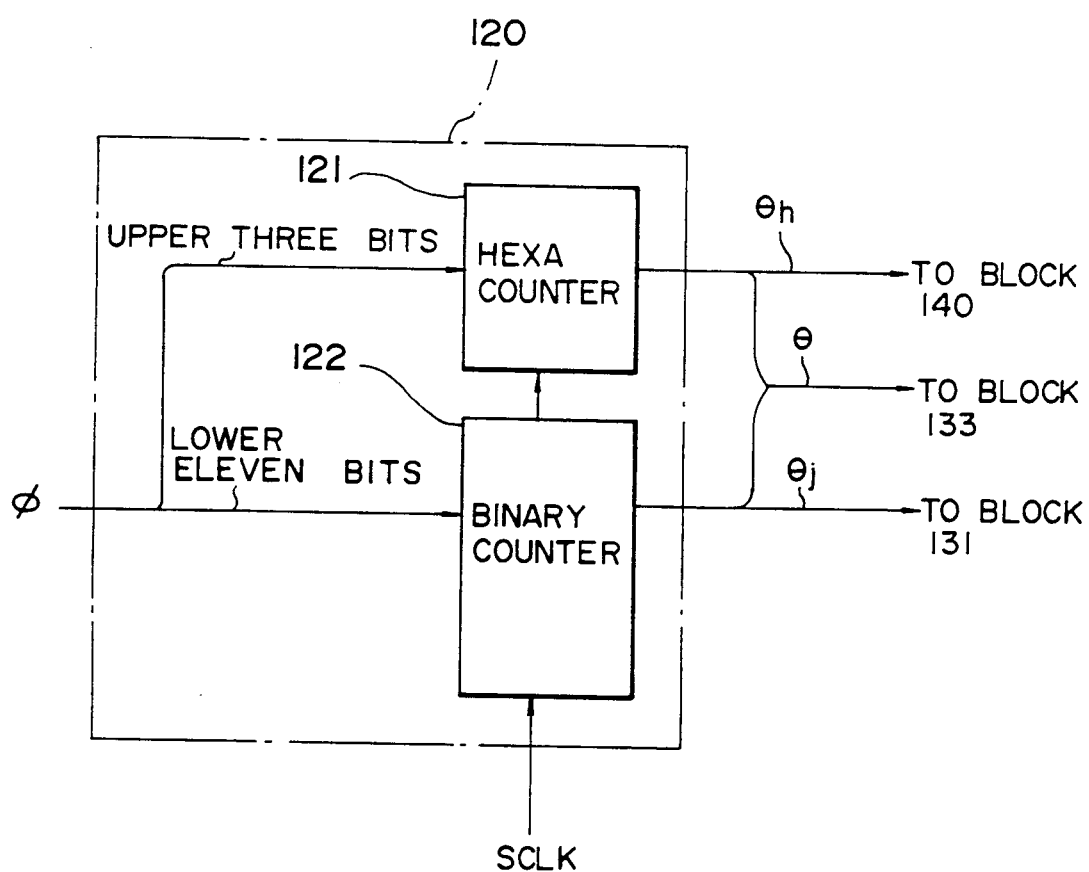
FIG. 6 is a block diagram showing the detailed construction of the voltage phase signal generator circuit shown in FIG. 1.

FIG. 6 is a circuit diagram showing the voltage phase signal generator circuit 120. The circuit 120 consists of a hexa counter 121 and a binary counter 122. The upper three bit signals of the phase difference angle signal $\phi$ are supplied to the hexa counter 121 and the lower eleven bit signals of the phase difference angle signal $\phi$ are supplied to the binary counter 122 when the signal $\phi$ is changed. The binary counter 12 counts the changed signal $\phi$ at each time of inputting a signal SCLK is input. One carry of the binary counter 122 serves to count up the hexa counter 122. With the action, the hexa counter 121 supplies an upper three-bit signal $\theta_h$ of the output voltage phase signal $\theta$ and the binary counter 121 supplies a lower eleven-bit signal $\theta_j$ of the signal $\theta$ is a 14-bit signal composed of the bit signals $\theta_h$ and $\theta_j$. The bit signal $\theta_h$ consists of numerical signals of "0" to "5" and is supplied to the phase voltage amplitude signal generator circuit 140. The bit signal $\theta_j$ is supplied to the triangular wave generator circuit 131. The signal $\theta$ is supplied to the firing phase determination circuit 133.

Figure 7:
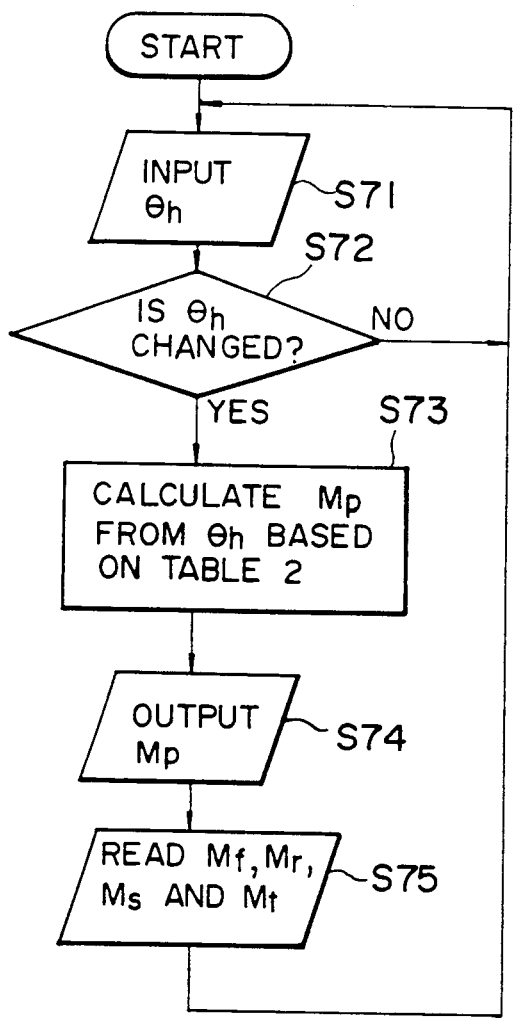
FIG. 7 is a flow chart for explaining the function of the phase voltage amplitude signal generator circuit shown in FIG. 1.

The phase voltage amplitude signal generator circuit 140 inputs a phase-judgment phase signal $\theta_h$ from the voltage phase signal generator circuit 120 to output a voltage amplitude signal per phase denoted by $M_p$ (hereinafter simply referred to as a phase voltage amplitude signal $M_p$) to the firing signal generator circuit 130 at the time when the phase-judgment phase signal $\theta_h$ changes. The relationship between the phase voltage amplitude signal $M_p$ output from the phase voltage sig- The circuit 140 consists of a microcomputer. The operation of the circuit 140 will be described with reference to a flowchart shown in FIG. 7.

The circuit 140 receives the $\theta_h$ signal from the voltage phase signal generator circuit 120 (step S71) and checks if the $\theta_h$ signal value is changed (step S72). If it is changed, the circuit 140 calculates the phase voltage amplitude signal $M_p$ on the foregoing Table 2 (or Table 4 to be described later) (step S73) and supplies it (step S74). Next, it reads the signals $M_f$, $M_r$, $M_s$, $M_t$ sent from the power control unit 8 (step S75). Then, returning to the operation of receiving the $\theta_h$ signal (step S71), the circuit 140 repeats the foregoing process.

The triangular wave generator circuit 131 within the firing signal generator circuit 130 inputs a 60° period phase signal $\theta_j$ from the voltage phase signal generator circuit 120 to output a triangular wave signal TRI to the firing timing determination circuit 132. For the triangular wave signal TRI, triangular waves each corresponding to an isosceles triangle with the phase angle of 30 degrees of the 60° period as a center are repeatedly output every 60° periods of the R-phase output voltage of the inverter 11, i.e., at periods of 60°, as shown in FIG. 5. Namely, from the time of 0 counts of the 60° period phase signal $\theta_j$ up to the time of 1023 counts thereof, the triangular wave signal TRI has a positive gradient corresponding to those count values, and from the time of 1023 counts of the 60° period phase signal $\theta_j$ up to the time of 2047 counts thereof, the triangular wave signal TRI has a negative gradient corresponding to from 1023 down to 0 counts.

Figure 8:
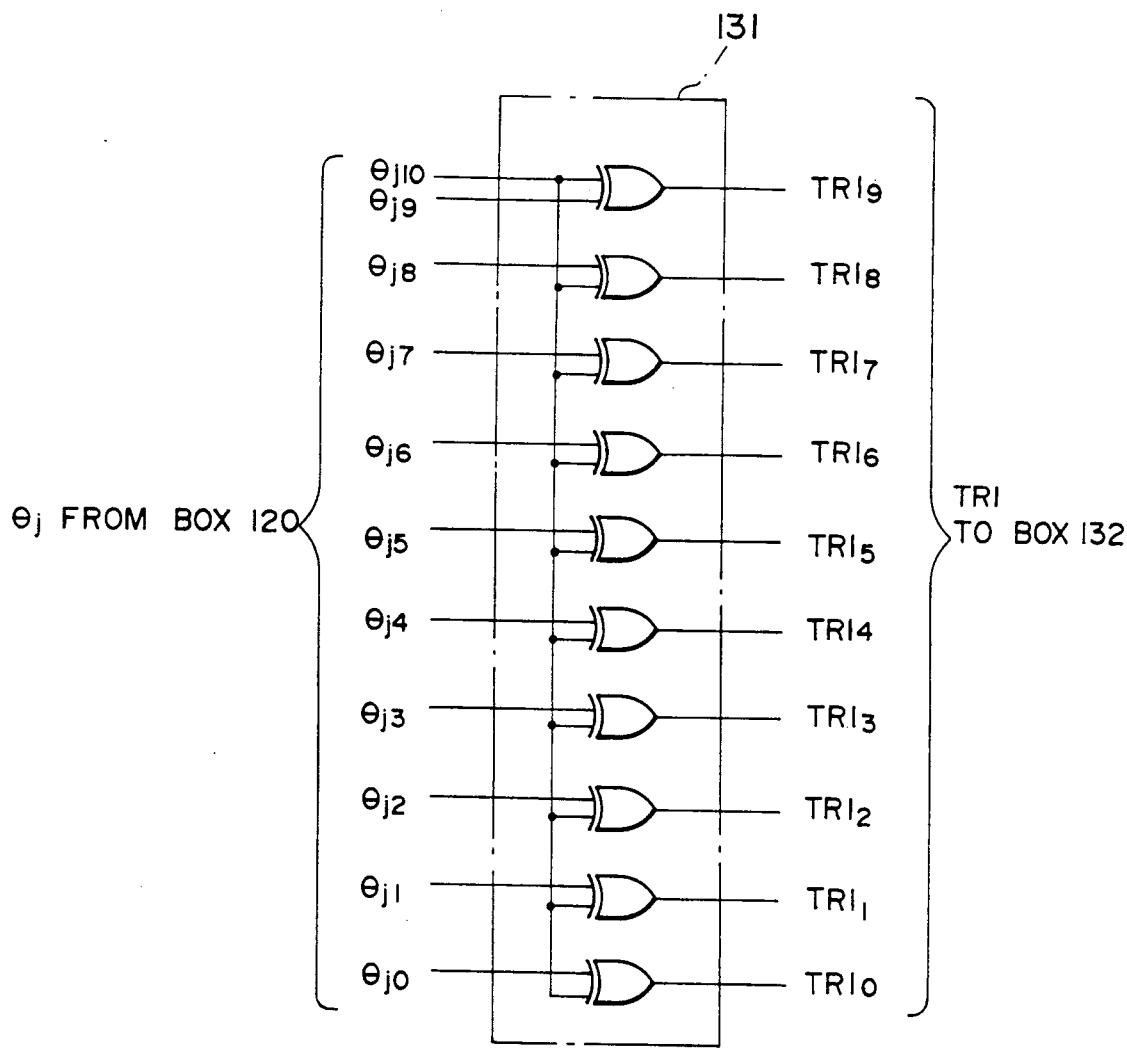
FIG. 8 is a connection diagram showing the detailed construction of the triangular wave generator circuit shown in FIG. 1.

FIG. 8 illustrates a circuit implementation realizing the triangular wave generator circuit 131. As shown, a 60° period phase signal $\theta_j$ consists of eleven bit signals $\theta_{j0}$, $\theta_{j1}$, $\theta_{j2}$, $\theta_{j3}$, $\theta_{j4}$, $\theta_{j5}$, $\theta_{j6}$, $\theta_{j7}$, $\theta_{j8}$, $\theta_{j9}$, and $\theta_{j10}$ and the triangular wave TRI consists of ten bit signals $TRI_0$, $TRI_1$, $TRI_2$, $TRI_3$, $TRI_4$, $TRI_5$, $TRI_6$, $TRI_7$, $TRI_8$, $TRI_9$. In the 60° period phase signal $\theta_j$ consisting of eleven bit signals, $\theta_{j0}$ denotes the least significant bit signal and $\theta_{j10}$ denotes the most significant bit signal. The triangular wave generator circuit 131 serves to respectively exclusive-OR the ten bit signals $\theta_{j0}$ to $\theta_{j9}$ with $\theta_{j10}$ and supplies ten bit signals of the triangular wave TRI. Since the bit signals $\theta_{j10}$ have an alternative value of "0" or "1" at each 30° phase, the triangular wave TRI becomes an isosceles triangle with the phase angle of 30 degrees of the 60° periods as a center.

The firing timing determination circuit 132 determines the timing for controlling the energization periods of respective controllable rectifier elements of the inverter 11 on the basis of the phase voltage amplitude signal $M_p$ from the phase voltage signal generator circuit 140 and the triangular wave signal TRI from the triangular wave generator circuit 131 in accordance with the time sequence shown in FIG. 5. A method of generating timing signals for determining energization periods of the controllable rectifier elements GY and GV and the controllable rectifier elements GU and GX of the inverter 11 carried out when the R-phase output voltage phase $\alpha$ of the inverter 11 is at time periods of 0° C.$\leq \alpha <$ 60° C. and 60° C.$\leq \alpha <$ 120° C., i.e., the phase-judgment phase signal $\theta_h$ represents "0" and "1" will be described with reference to FIG. 5.

When the inverter R-phase output voltage phase $\alpha$ of FIG. 5 is at a time period of 0° C.$\leq \alpha <$ 60° C., i.e., the phase-judgment phase signal $\theta_h$ represents "0", as is apparent from Table 3, signal $M_y$ is output as the phase voltage amplitude signal $M_p$. The signal $M_y$ and the triangular wave signal TRI are compared with each other to output a signal TIM indicating the times $a_1$ and $a_2$ at which both signals are equal to each other. The firing-phase determination circuit 133 determines the energization periods on the basis of the signal TIM obtained from the firing timing determination circuit 132 at the times of $a_1$ and $a_2$ and the output voltage phase signal $\theta$ from the voltage phase signal generator circuit 120 so that the controllable rectifier elements GU and GW are energized and the controllable rectifier elements GX and GZ are not energized because controllable rectifier elements except for the controllable rectifier elements GV and GY of controllable rectifier elements of the inverter 11 are such that phase-judgment signal $\theta_h$ of the digital phase signal $\theta$ represents "0".

When the inverter R-phase output voltage phase $\alpha$ is at a time period of 60° C.$\leq \alpha <$ 120° C., as is apparent from Table 3, signal $M_u$ is output as the phase voltage amplitude signal $M_p$. The signal $M_u$ and the triangular wave signal TRI are compared with each other to output a signal TIM indicating the times $b_1$ and $b_2$ at which both signals are equal to each other to the firing-phase determination circuit 133. The firing-phase determination circuit 133 determines, as shown in Table 3, energization periods except for the controllable rectifier elements GU and GX of controllable rectifier elements of the inverter 11 on the basis of the signal TIM obtained from the firing timing determination circuit 132 at the times of $b_1$ and $b_2$ and the output voltage phase signal $\theta$ from the voltage phase signal generator circuit 120. The firing-phase determination circuit 133 determines respective energization periods so that the controllable rectifier elements GV and GW are not energized and the controllable rectifier elements GY and GZ are energized because controllable rectifier elements except for the controllable rectifier elements GV and GY of controllable rectifier elements of the inverter 11 are such that the phase-judgment phase signal $\theta_h$ of the output voltage phase signal $\theta$ represents "1".

Also when the inverter R-phase output voltage phase $\alpha$ is at respective 60° periods except for 0° C.$\leq \alpha <$ 60° C. or 60° C.$\leq \alpha <$ 120° C., the phase voltage amplitude signal $M_p$ of Table 3 takes respective values of $M_z$, $M_v$, $M_x$ and $M_w$ in dependence upon the phase-judgment phase signal $\theta_h$. Thus, energization periods of respective controllable rectifier elements of the inverter 11 are determined.

The firing timing determination circuit 132 serves to compare the triangular wave signal TRI with the phase voltage amplitude signal $M_p$ and supplies the signal TIM as shown in FIG. 5 when the triangular wave signal TRI is equal to or more than the phase voltage amplitude signal $M_p$. This circuit is implemented by digital comparator LSIs such as TI 74LS85 or TI 74LS682 (manufactured by Texas Instruments).

The firing-phase determination circuit 133 serves to define energization periods of the element of the inverter 11 as shown in FIG. 5 from the phase-judgment phase signal $\theta_h$ and the signal TIM on the basis of the Table 3. This circuit is implemented by a ROM (read-only memory) consisting of a memory IC and is designed to input the phase-judgment phase signal $\theta_h$ and the signal TIM to the ROM addresses and outputting the data written on the Table 3 as the energization periods of the elements of the inverter 11. The ROM may employ TI TBP28S42.

The difference between the control system of this invention and the conventional PWM control system resides in that the modulation factor M corresponding to the phase voltage amplitude signal $M_p$ of FIG. 5 is altered independent of the phase of the output voltage of the inverter 11 in the latter system. In this invention, by changing the phase voltage amplitude signal $M_p$ so that it becomes equal to signals $M_y$, $M_u$, $M_z$, $M_v$, $M_x$ and $M_w$ every phase angle of 60° of the inverter R-phase output voltage, it is possible to control the amplitudes of the phase output voltages of the inverter 11 in regard to respective phases every positive or negative side thereof. The controlled phase-voltages of the output voltages of the inverter 11, are also described together in Table 3.

As described above, the control apparatus of FIG. 1 can control the amplitudes of the respective phase output voltages of the inverter 11 with regard to respective phases every positive or negative side of the amplitudes. Thus, even in the case where there is unevenness in the characteristics of the respective controllable rectifier elements of the inverter 11, this control apparatus can eliminate d.c. components produced in the output voltage energy respective phase. Accordingly, this makes it possible to allow currents flowing in respective controllable rectifier elements to be balanced to prevent d.c. polarized magnetization of the inter-connecting transformer 40, resulting in stable operation of the inverter 11.

In the above-described embodiment, changes in the phase voltage amplitude signal $M_p$ based on changes in the phase-judgment phase signal $\theta_h$ are determined in accordance with Table 2. However, such a determination may be conducted as shown in Table 4.

TABLE 4

| Change of Phase-Judgement Phase Signal $\theta_h$ | Phase Voltage Amplitude Signal $M_p$ |
|---|---|
| Change from 0 to 1 | $M_f + M_s = M_{sl}$ |
| Change from 1 to 2 | $M_f + M_r = M_{rl}$ |
| Change from 2 to 3 | $M_f + M_t = M_{tl}$ |
| Change from 3 to 4 | $M_f + M_s = M_{sl}$ |
| Change from 4 to 5 | $M_f + M_r = M_{rl}$ |
| Change from 5 to 0 | $M_f + M_t = M_{tl}$ |

In this case, the inverter output voltage will be controlled per each phase. The relationship between the phase-voltage controlled and the phase voltage amplitude signal $M_p$ of the output voltage of the inverter 11 is as shown in the Table 5.

TABLE 5

| Phase $\alpha$ of Inverter R-phase Output Voltage | $0° \leq \alpha < 60°$ | $60° \leq \alpha < 120°$ | $120° \leq \alpha < 180°$ | $180° \leq \alpha < 240°$ | $240° \leq \alpha < 300°$ | $300° \leq \alpha < 360°$ |
|---|---|---|---|---|---|---|
| Phase-judgement phase signal $\theta_h$ | 0 | 1 | 2 | 3 | 4 | 5 |
| Phase voltage amplitude signal $M_p$ | $M_f + M_s = M_{sl}$ | $M_f + M_r = M_{rl}$ | $M_f + M_t = M_{tl}$ | $M_f + M_s = M_{sl}$ | $M_f + M_r = M_{rl}$ | $M_f + M_t = M_{tl}$ |
| Elements subject to energization period control of inverter 10 | GY and GV | GU and GX | GZ and GW | GV and GY | GX and GU | GW and GZ |
| Phase voltage controlled of output voltages of inverter 10 | S-phase | R-phase | T-phase | S-phase | R-phase | T-phase |

By effecting control in this way, even in the case where the voltage of the a.c. system 50 is imbalanced per phase, it is possible to individually control the output voltage of the inverter 11 per phase. Accordingly, control such that an output current of a specified phase of the inverter 11 is not caused to flow above an allowed current value of the element is conducted, thereby making it possible to stably operate the inverter 11.

In the apparatus of FIG. 1, a scheme is employed to output the modulation factor signal $M_f$, and correction modulation factor signals $M_r$, $M_s$, and $M_t$ per phase from the power control unit 8 to the phase voltage amplitude signal generator circuit 140. In addition, a scheme may be employed to output the phase voltage amplitude signals $M_y$, $M_u$, $M_z$, $M_v$, $M_x$ and $M_w$ of Table 3 or the phase voltage amplitude signals $M_{rl}$, $M_{sl}$ and $M_{tl}$ of Table 5 which are varied by the phase-judgment phase signal $\theta_h$ from the power control apparatus 8 to the phase voltage amplitude signal generator circuit 140. In this case, the phase voltage amplitude signal generator circuit 140 outputs, by the phase-judgment phase signal $\theta_h$, these phase voltage amplitude signals $M_y$, $M_u$, $M_z$, $M_v$, $M_x$ and $M_w$ or the phase voltage amplitude signals $M_{rl}$, $M_{sl}$ and $M_{tl}$, to the firing signal generator circuit 130.

As described above, the apparatus for controlling a power converter according to this invention is constructed to obtain a voltage amplitude adjustment signal for determining the voltage amplitudes per each phase of an a.c. voltage generated in the power converter to switch voltage amplitude adjustment signals every respective phase in accordance with an output voltage phase signal from the output voltage phase signal generator circuit to produce a phase voltage amplitude signal to determine energization periods of respective controllable rectifier elements constituting the power converter from the phase voltage amplitude signal and the output voltage phase signal, to thereby control the output voltage of the power converter per phase. Accordingly, this apparatus can correct imbalance between respective phases of the output alternative currents of the power converter, or suppress d.c. components included in output currents of respective phases.

We claim:

1. An apparatus for controlling a power converter, which is adapted to control, in accordance with the PWM control system, a power converter for system interconnection interposed between a d.c. power source and an a.c. system to interchange power therebetween, said apparatus for controlling power converter comprising:

synchronous detector means for detecting a phase of an a.c. system voltage to output it as a synchronization signal;

voltage phase-signal generator means for determining a phase of an output a.c. voltage of said power converter from a phase difference angle adjustment signal for determination of a phase difference between said a.c. system voltage and said output a.c. voltage of said power converter and said synchronization signal from said synchronous detector means to output it as an output voltage phase signal;

phase voltage amplitude signal generator means responsive to a voltage amplitude adjustment signal for determining an amplitude per phase of said output a.c. voltage to switch voltage amplitude adjustment signals of at least two phases in accordance with said output voltage phase signal from said voltage phase-signal generator means to output a signal obtained by switching as a phase voltage amplitude signal; and firing signal generator means for determining energization periods of respective controllable rectifier elements constituting said power converter on the basis of said output voltage phase signal from said voltage phase-signal generator means and said phase voltage amplitude signal from said phase voltage amplitude signal generator means.

2. A control apparatus as set forth in claim 1, wherein said firing signal generator means comprises:

triangular wave generator means for generating a triangular wave signal having a period of 60 degrees on the basis of said output voltage phase signal from said voltage phase-signal generator means;

a firing timing determination circuit for forming a timing signal for determining energization periods of respective controllable rectifier elements of said power converter on the basis of said triangular wave signal from said triangular wave generator means and said phase voltage amplitude signal from said phase voltage amplitude signal generator means; and a firing phase determination circuit for determining a controllable rectifier element or elements to be fired on the basis of said output voltage phase signal from said voltage phase signal generator means and said timing signal from said firing timing determination circuit.

3. A control apparatus as set forth in claim 1, wherein said output voltage phase signal from said voltage phase-signal generator means consists of a phase-judgment phase signal indicating a period of 360 degrees of said output a.c. voltage from said power converter every period of 60 degrees with a specified phase thereof being as a reference, and a 60 degrees period phase signal repeating the operation for counting up from zero to a predetermined value to further count down from said predetermined value to zero every period of 60 degrees, said phase-judgment phase signal being delivered to said phase voltage amplitude signal generator means, and said 60 degrees period phase signal being delivered to said firing signal generator means.

4. A control apparatus as set forth in claim 1, which further comprises:

a first voltage detector for detecting a voltage of said a.c. system;

a second voltage detector for detecting a voltage of said d.c. power source;

a current detector for detecting an output current of said power converter; and power control means for forming said phase difference angle adjustment signal and said voltage amplitude adjustment signal on the basis of a voltage of said a.c. system, a voltage of said d.c. power source and said output current of said power converter which are detected by said respective detectors.

5. A control apparatus as set forth in claim 1, wherein said phase voltage amplitude signal generator means outputs a signal for independently controlling amplitudes of respective phase output voltages of said converter with respect to both positive and negative sides to said respective controllable rectifier elements of said power converter, as a phase voltage amplitude signal.

6. A control apparatus as set forth in claim 1, wherein said phase voltage amplitude signal generator means outputs a signal for controlling the amplitude of respective phase output voltages of said power converter every respective phase, to said respective controllable rectifier elements of said power converter as a phase voltage amplitude signal.

* * * * *